United States Patent
Skriver et al.

(10) Patent No.: US 12,184,548 B2
(45) Date of Patent: Dec. 31, 2024

(54) IMPLEMENTING BORDER GATEWAY PROTOCOL (BGP) OPTIMAL ROUTE REFLECTION

(71) Applicant: Arista Networks, Inc., Santa Clara, CA (US)

(72) Inventors: Jesper Skriver, Nicosia (CY); Isidoros Kouvelas, Nicosia (CY); Asang Kamalakar Dani, Nagpur (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 296 days.

(21) Appl. No.: 17/739,668

(22) Filed: May 9, 2022

(65) Prior Publication Data

US 2023/0327991 A1    Oct. 12, 2023

(30) Foreign Application Priority Data

Apr. 12, 2022   (EP) .................................. 22386019

(51) Int. Cl.
*H04L 45/745*   (2022.01)
*H04L 45/02*    (2022.01)
*H04L 45/12*    (2022.01)

(52) U.S. Cl.
CPC .......... *H04L 45/745* (2013.01); *H04L 45/124* (2013.01); *H04L 45/04* (2013.01)

(58) Field of Classification Search
None
See application file for complete search history.

(56) References Cited

U.S. PATENT DOCUMENTS

| | | | |
|---|---|---|---|
| 2017/0104676 A1 | 4/2017 | Patel et al. | |
| 2019/0297005 A1* | 9/2019 | Pignataro | ................ H04L 45/02 |
| 2021/0336877 A1* | 10/2021 | Ramsland | ............. H04L 45/021 |
| 2021/0367883 A1* | 11/2021 | Zhang | ................... H04L 41/122 |
| 2022/0360470 A1* | 11/2022 | Malhotra | .............. H04L 45/741 |

FOREIGN PATENT DOCUMENTS

| | | |
|---|---|---|
| EP | 3913871 A1 | 11/2021 |
| WO | WO2016/133821 A1 | 8/2016 |

OTHER PUBLICATIONS

R. Raszuk, Ed., RFC 9107 BGP Optimal Route Reflection (BGP ORR), Internet Engineering Task Force (IETF), Aug. 2021, (9 pages).
Extended European Search Report issued for European Patent Application No. 22386019.8, mailed on Sep. 7, 2022, 11 pages.
Raszuk et al., BGP Optimal Route Reflection (BGP-ORR), Jan. 2021, 14 pages.

* cited by examiner

*Primary Examiner* — Xavier S Wong
(74) *Attorney, Agent, or Firm* — Sprinkle IP Law Group (57) ABSTRACT

A method for distributing an optimal path to a router using a route reflector, that includes obtaining, by the route reflector, a path location bitmask associated with the optimal path, obtaining a router location bitmask associated with the router, performing a bitwise AND operation on the path location bitmask and the router location bitmask to obtain a result bitmask, identifying a nonzero bit in the result bitmask, and in response to identifying the nonzero bit, sending the optimal path to the router.

20 Claims, 10 Drawing Sheets

| | Path Identifiers 1024 | Destination Network Identifiers 1030 | Path Location Bitmasks 1044 | Router Location Bitmasks 1046 |
|---|---|---|---|---|
| Path Entry A 1042A | "P_A" | "Destination Net A" | 100 | |
| Path Entry B 1042B | "P_B" | "Destination Net A" | 010 | R_AA: 100<br>R_AB: 100<br>R_BA: 010<br>R_BB: 010<br>R_CA: 001<br>R_CB: 001 |
| Path Entry C 1042C | "P_C" | "Destination Net A" | 001 | |
| Path Entry D 1042D | "P_D" | "Destination Net B" | 111 | |

Routing Table 1040

Router Path Metrics Table 920

| | | | | Path Identifiers 924 | | | | |
|---|---|---|---|---|---|---|---|---|
| | | | | "P_A" | "P_B" | "P_C" | "P_D" | |
| | Router Identifiers 926 | location identifiers 928 | Destination Identifiers 930 | Path Cost A 932A | Path Cost B 932B | Path Cost C 932C | Path Cost D 932D | Optimal Path Identifiers 934 |
| Entry AA 922AA | "Router AA" | "City A" | "Destination Net A" | 1 | 11 | 21 | N/A | "P_A" |
| Entry BA 922BA | "Router AB" | "City A" | "Destination Net A" | 6 | 16 | 26 | N/A | "P_A" |
| Entry CA 922CA | "Router BA" | "City B" | "Destination Net A" | 11 | 1 | 11 | N/A | "P_B" |
| Entry DA 922DA | "Router BB" | "City B" | "Destination Net A" | 16 | 6 | 16 | N/A | "P_B" |
| Entry EA 922EA | "Router CA" | "City C" | "Destination Net A" | 21 | 11 | 1 | N/A | "P_C" |
| Entry FA 922FA | "Router CB" | "City C" | "Destination Net A" | 26 | 16 | 6 | N/A | "P_C" |
| Entry AB 922AB | "Router AA" | "City A" | "Destination Net B" | N/A | N/A | N/A | 26 | "P_D" |
| Entry BB 922BB | "Router AB" | "City A" | "Destination Net B" | N/A | N/A | N/A | 21 | "P_D" |
| Entry CB 922CB | "Router BA" | "City B" | "Destination Net B" | N/A | N/A | N/A | 16 | "P_D" |
| Entry DB 922DB | "Router BB" | "City B" | "Destination Net B" | N/A | N/A | N/A | 11 | "P_D" |
| Entry EB 922EB | "Router CA" | "City C" | "Destination Net B" | N/A | N/A | N/A | 6 | "P_D" |
| Entry FB 922FB | "Router CB" | "City C" | "Destination Net B" | N/A | N/A | N/A | 1 | "P_D" |

FIG. 9

Routing Table 1040

| | Path Identifiers 1024 | Destination Network Identifiers 1030 | Path Location Bitmasks 1044 | Router Location Bitmasks 1046 |
|---|---|---|---|---|
| Path Entry A 1042A | "P_A" | "Destination Net A" | 100 | R_AA: 100<br>R_AB: 100<br>R_BA: 010<br>R_BB: 010<br>R_CA: 001<br>R_CB: 001 |
| Path Entry B 1042B | "P_B" | "Destination Net A" | 010 | |
| Path Entry C 1042C | "P_C" | "Destination Net A" | 001 | |
| Path Entry D 1042D | "P_D" | "Destination Net B" | 111 | |

FIG. 10

IMPLEMENTING BORDER GATEWAY PROTOCOL (BGP) OPTIMAL ROUTE REFLECTION

RELATED APPLICATION(S)

This application is based upon and claims the benefit of priority from European Patent Application No. EP22386019.8 filed Apr. 12, 2022, the entire contents of which are incorporated herein by reference.

BACKGROUND

In some network environments, the most optimal route is not sufficiently shared with each router in the network. In such scenarios, it may be desirable to adapt one or more network devices to enhance the functionalities of the network device to allow for optimal route determination and sharing.

DETAILED DESCRIPTION

Border Gateway Protocol (BGP) is a mechanism that is used to distribute routes between routers (e.g., BGP peers). The routers use the received routes to program their own network device hardware (e.g., forwarding tables). In order to facilitate the distribution of routes using BGP, some networks include route reflectors. A route reflector includes functionality to establish BGP sessions with routers in the network. Once the BGP sessions are established, the routers send their routes to the route reflector and the route reflector, in turn, transmits the routes to all other routers. In this manner, the routers do not need to maintain direct BGP sessions with each of the other routers in the network.

In various implementations, the route reflectors do not merely transmit all received routes to all of the routers; rather, the route reflectors may only transmit the optimal route for a given network destination to the other routers. The route reflector may make this decision from its point of view (i.e., what is the optimal route from the perspective of the route reflector). To improve upon the routes that are distributed to the various routers, some route reflectors implement optimal route reflection. When implementing optimal route reflection, the route reflector does not determine the optimal route from its perspective; rather, the route reflector determines the optimal route from the perspective of the router that is receiving the routes from the route reflector. Thus, in optimal route reflection each router may receive routes that are optimized for it.

The route reflector may also implement various policies that are used to modify the routes determined using optimal route reflection prior to the routes being transmitted to the various routers. Conventionally, routers that are expected to receive the same set of routes are grouped together and then the policies are applied for each such group to these routes to generate modified routes.

The application of these policies to the various routes may include a significant amount of computing resources. Further, in many scenarios, the same policy is often applied to the same routes, each associated with a different group of routers. In these scenarios, the same processing is duplicated for each group of routers. This results in performing the same modification to the same route multiple times and also storing multiple copies of the resulting modified route. Thus, in these scenarios, there is inefficient use of computing resources and inefficient use of storage on the route reflector.

To address the above inefficiencies with route reflectors, optimal route reflection is implemented. Herein, embodiments are directed to: (i) identifying the routes that need to be distributed, (ii) applying the appropriate policies to each of these routes to obtain modified routes; (iii) tagging each of the modified routes with a position bitmask that specifies which optimal route reflection positions (i.e., which routers) should receive each of the modified routes, and (iv) associate each of routers with an identifier bitmask (which uniquely identifies the position associated with the router).

When a given modified route is to be distributed by the route reflector, the route reflector obtains the position bitmask for the modified route and performs a bitwise "AND" operation with the identifier bitmask of each of the routers. If the result of the bitwise "AND" operation for a given router is a non-zero bit map, then the modified route is transmitted to the router. The following is a non-limiting example of the above.

Consider a scenario in which there are three modified routes for the same network destination (i.e., R1, R2, R3), where R1 is to be sent to Router 1, R2 is to be sent to Router 2, and R3 is to be sent to Routers 1 and 2. Based on this, the following set of bitmasks may be present in the route reflector for the routes and the routers:

| Modified Route | Position Bitmask |
|---|---|
| R1 | 10 |
| R2 | 01 |
| R3 | 11 |

| Router | Identifier Bitmask |
|---|---|
| Router 1 | 10 |
| Router 2 | 01 |

Using the above bitmasks, when the route reflector needs to determine which router to send each of R1-R3, the route reflector performs a bitwise "AND" operation with the router's position identifier bitmask and each of the route's Position Bitmasks. Thus, for Router 1, the following "AND"

operations are performed: (i) 10 AND 10=10; (ii) 10 AND 01=00; and (iii) 10 AND 11=10. Based on the results of the three AND operations, Router 1 receives R1 and R3. Turning to Router 2, the following "AND" operations are performed: (i) 01 AND 10=00; (ii) 01 AND 01=01; and (iii) 01 AND 11=01. Based on the results of the three AND operations, Router 2 receives R2 and R3.

By implementing the aforementioned embodiments, the route reflector does not need to, e.g., generate two copies of R3 and store two copies of R3; rather, the route reflector only needs to generate and store a single copy of the R3. In this manner, the route reflector saves both computing resources and storage space.

The following describes various embodiments of the disclosure.

Figure 1:
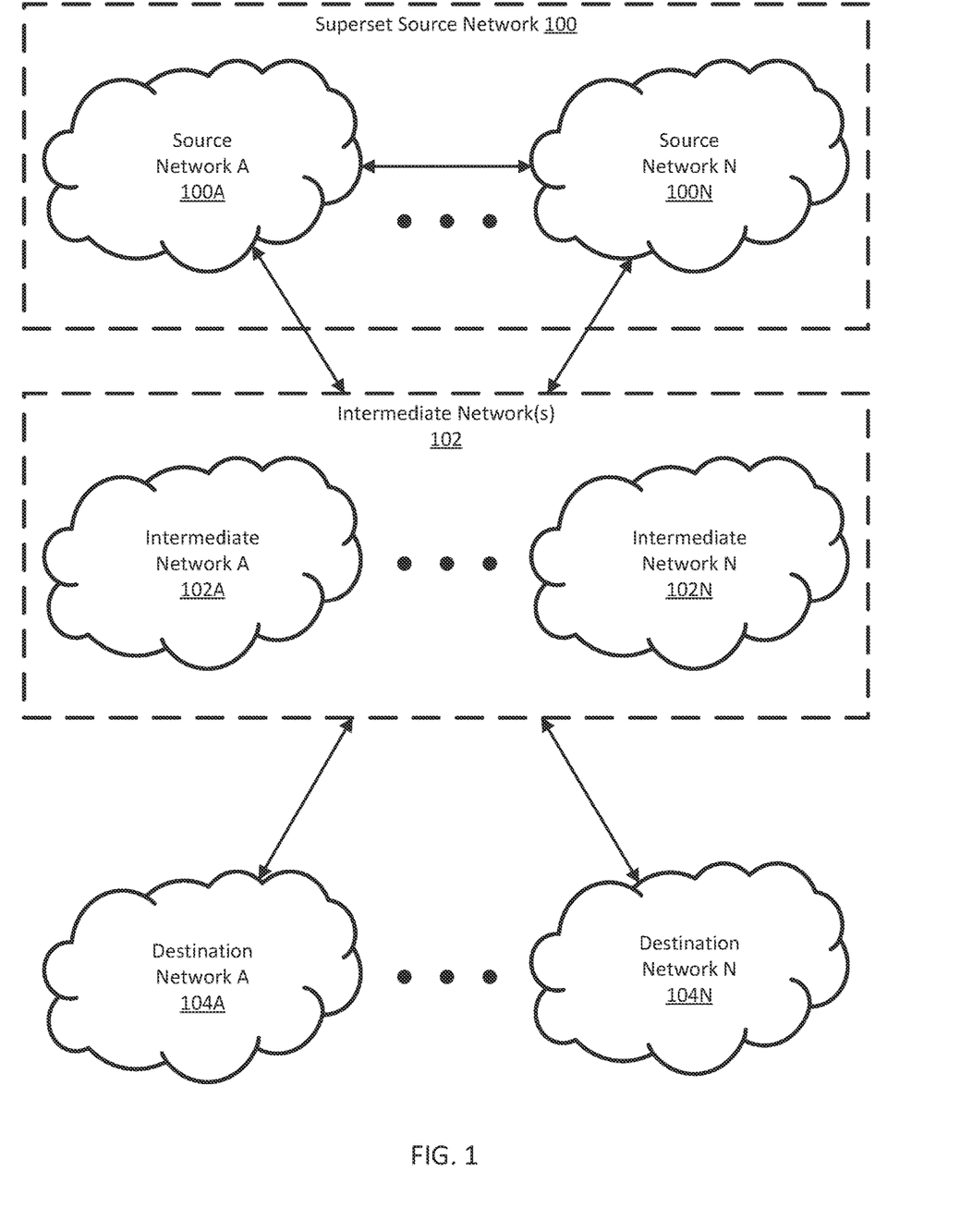
FIG. 1 shows a diagram of various networks, in accordance with one or more embodiments.

FIG. 1 shows a diagram of various networks, in accordance with one or more embodiments. Specifically, a superset source network that includes one or more source network(s)(e.g., source network A (100A), source network N (100N)) may be operatively connected to one or more destination network(s) (e.g., destination network A (104A), destination network N (104N)) via one or more intermediate network(s) (102). Each of these components is described below.

In one or more embodiments, a network is a collection of connected network devices (not shown) that allow for the communication of data from one network device to other computing device(s) (not shown), or the sharing of resources among network devices. Non-limiting examples of a network include a local area network (LAN), a wide area network (WAN) (e.g., the Internet), a mobile network, or any other type of network that allows for the communication of data and sharing of resources among network devices and/or computing devices operatively connected to the network. One of ordinary skill in the art, having the benefit of this detailed description, would appreciate that a network is a collection of operatively connected computing devices that enables communication between those devices.

In one or more embodiments, a superset source network (e.g., superset source network (100)) is a grouping of two or more source networks (100A, 100N) to form a network. Source networks (100A, 100N) in a superset source network (100) may be joined by a route reflector (not shown) using one or more interior BGP (iBGP) sessions. Further, network devices (not shown) in the source networks (100A, 100N) may be operatively connected via one or more layer-3 connections to other network devices within the same source network (100A, 100N) and/or with network devices in other source network(s) (100A, 100N).

In one or more embodiments, a source network (e.g., source network A (100A), source network N (100N)) is a network. In one or more embodiments, a destination network (e.g., destination network A (104A), destination network N (104N)) is a network. Although the number of destination networks (104A, 104N) and source networks (100A, 100N) are shown to be the same, there can be any different number of either type, independent of each other.

In one or more embodiments, a source network may be defined by its geographic region. As a non-limiting example, a source network (100A, 100N) may exist within (or primarily be centered around) a city (e.g., New York City, London, Paris, etc.). Further, a superset source network (100) may be defined by the broader geographic region in which the constituent source networks (100A, 100N) reside. As an example, if there are three source networks ("Houston", "Dallas", and "Austin") the superset source network may be defined as "Texas". However, the boundary for the superset source network (100) does not need to follow a politically defined boundary. As another example, if the three cities are "Prague", "Vienna", and "Budapest", the superset source network may be informally defined as "Eastern Europe".

In one or more embodiments, an intermediate network (e.g., intermediate network(s) (102), intermediate network A (102A), intermediate network N (102N)) is a network. An intermediate network (102A, 102N) may be a local area network or a wide area network (e.g., the Internet) and operatively connects one or more source network(s) (100A, 100N) to one or more destination network(s) (104A, 104N). Communication between networks (i.e., the devices in those networks) may be accomplished via certain network devices (not shown) that may communicate inside their own network and further be configured to communicate with devices in other networks (i.e., edge network devices). One of ordinary skill in the art, having the benefit of this detailed description, would appreciate the intercommunication of network devices between logically disparate networks.

While FIG. 1 shows a specific configuration of a system, other configurations may be used without departing from the scope. Accordingly, embodiments disclosed herein should not be limited to the configuration of devices and/or components shown in FIG. 1.

Figure 2:
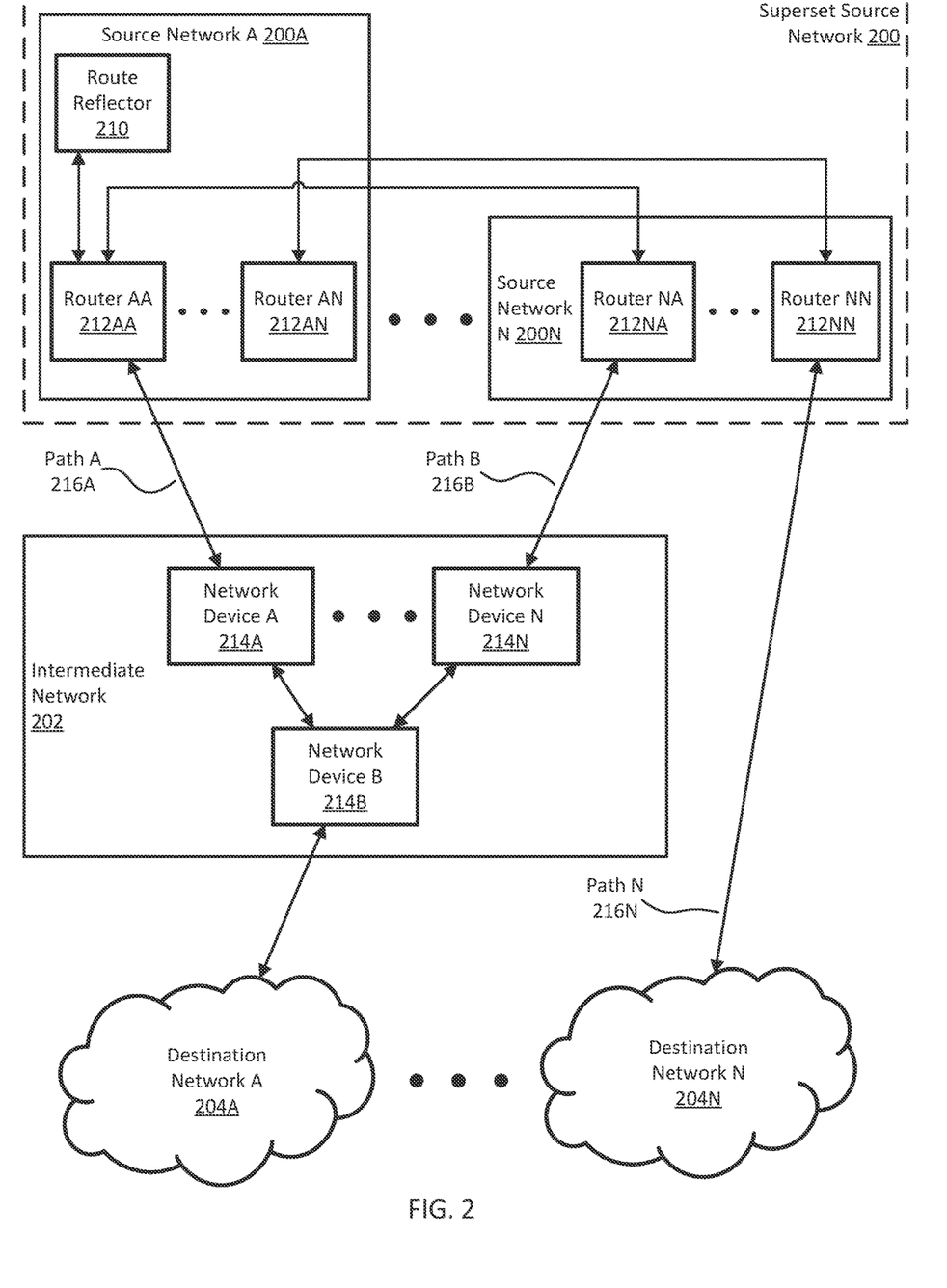
FIG. 2 shows a diagram of various networks with devices therein, in accordance with one or more embodiments.

FIG. 2 shows a diagram of various networks with devices therein, in accordance with one or more embodiments. The superset source network (200) may include one or more source network(s) (source network A (200A), source network B (200N)). Further, a source network (200A, 200N) may include a route reflector (210) and one or more router(s) (212) operatively connected to one or more network device(s) (214) in an intermediate network (202). Similarly named components, shown in this figure, have all of the same properties and functionalities as described in previous figures. Accordingly, only additional components, properties, and functionalities will be described below.

In one or more embodiments, a computing device includes one or more processor(s), memory, persistent storage, input and output device(s), physical interface(s) (e.g., network ports, device peripherals), light emitting diodes (LEDs), optical transceivers, network chips, or any combination thereof. The persistent storage (and/or memory) may store computer instructions (e.g., computer code) which, when executed by the processor(s) of the computing device, cause the computing device to perform one or more processes specified in the computer instructions.

Non-limiting examples of a computing device include a network device (e.g., switch, router, multi-layer switch, etc.), a server (e.g., a blade-server in a blade-server chassis, a rack server in a rack, etc.), a personal computer (e.g., desktop, laptop, tablet, smart phone, personal digital assistant), and/or any other type of computing device with the aforementioned capabilities. Further, a computing device may execute a virtualized environment where hardware devices may be virtualized and presented to software differently than the physical underlying hardware configuration (e.g., an enterprise server executing virtual machine instances). Further, a computing device may execute a virtualized environment where hardware devices may be virtualized and presented to software differently than the physical underlying hardware configuration (e.g., an enterprise server executing virtual machine instances).

In one or more embodiments, a router (e.g., router AA (212AA), router AN (212AN), router NA (212NA), router NN (212NN)) is a network device that performs the functions of directing network traffic between computing devices and other network devices. To perform these functions, a router (212) may use one or more data structures (e.g., a routing table (routing information base (RIB)), a forwarding information base (FIB), etc.) to identify which computing devices any given network packet should be forwarded towards in order to have that packet, ultimately, arrive at its destination. In one or more embodiments, in a network (e.g., superset source network (200)) where there is an iBGP configuration between one or more routers (212), a router (212) may receive information to populate one or more data structures from a route reflector (210).

In one or more embodiments, a path (e.g., path A (216A), path B (216B), path N (216N)) is an operative connection between network devices belonging to different networks (outside of a superset network). For example, as shown in FIG. 2, router AA (212AA) is operatively connected to a network device A (214A) in the intermediate network (202) via path A (216A). Similarly, router NA (212NA) is operatively connected to network device N (214N) via path B (216B) and router NN (212NN) is operatively connected to a network device (not shown) in destination network N (204N) via Path N (216N). In one or more embodiments, a path may utilize external BGP (eBGP) protocols.

In one or more embodiments, a route reflector (e.g., route reflector (210)) is a network device (or a part of a network device) that identifies, stores, analyzes, and/or distributes network routes to one or more router(s) (212). In FIG. 2, although the route reflector (210) is shown to only be connected to router AA (212AA), the route reflector is still able to communicate with all routers (212) either directly (not shown) or via the operative connections between the routers (212). Specifically, the route reflector (210) may communicate via an iBGP session with one or more router(s) (212). Further, a route reflector may generate, maintain, update, and/or distribute a router path metrics table (not shown) and a routing table (not shown). A router path metrics table and a routing table may be stored in storage or memory of the route reflector (210) and/or may be remotely accessible by the route reflector (210). Additional details regarding the router path metrics table may be found in the description of FIG. 3. Additional details regarding the routing table may be found in the description of FIG. 4.

While FIG. 2 shows a specific configuration of a system, other configurations may be used without departing from the scope. Accordingly, embodiments disclosed herein should not be limited to the configuration of devices and/or components shown in FIG. 2.

Figure 3:
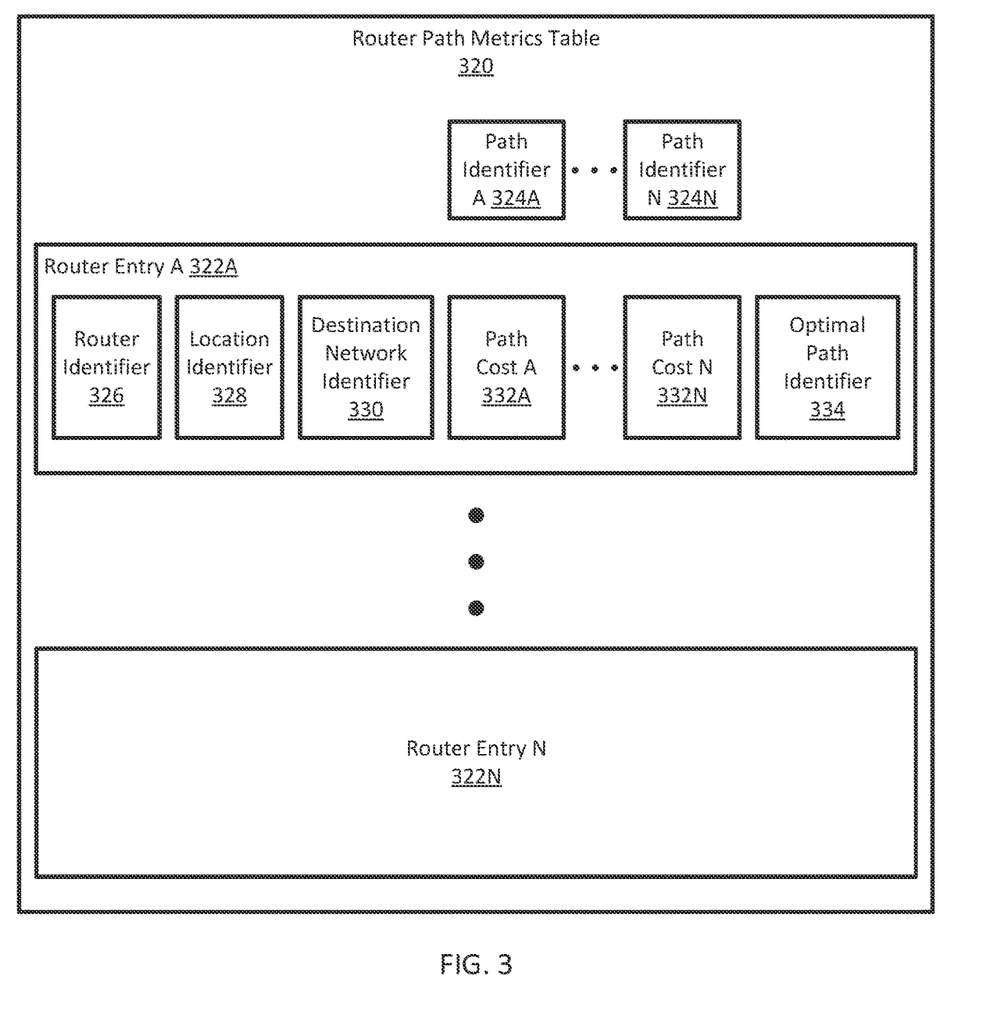
FIG. 3 shows a diagram of router path metrics table, in accordance with one or more embodiments.

FIG. 3 shows a diagram of router path metrics table, in accordance with one or more embodiments. In one or more embodiments, a router path metrics table (e.g., router path metrics table (320)) is a data structure, stored in the memory/storage of the route reflector (not shown). The router path metrics table (320) may include one or more router entries (e.g., router entry A (322A), router entry N (322N)). Further, each router entry (322) may include one or more path cost(s) (e.g., path cost A (332A), path cost N (332N)) that is associated with one or more respective path identifier(s) (e.g., path identifier A (324A), path identifier N (324N)). Although the router path metrics table (320) is referred to as a "table", any data structure may be used that is capable of storing information as described herein. Each of these components is described below.

In one or more embodiments, an alphanumeric expression is a string of one or more letter(s), number(s), symbol(s), and/or other character(s). An alphanumeric expression may be encoded using a standard protocol for digital characters (e.g., Unicode, American Standard Code for Information Interchange (ASCII), etc.). In one embodiment, an alphanumeric expression may be provided by a user and uniquely identify the associated data to one or more users (e.g., "vol_4", "engineering", "sales_east", etc.). In one embodiment, an alphanumeric expression may be automatically generated by one or more computing devices (e.g., "system1", "path_A", "StorDev5", etc.). One of ordinary skill in the art, having the benefit of this detailed description, would appreciate that there are many possible variations of alphanumeric expressions.

In one or more embodiments, a path identifier (e.g., path identifier A (324A), path identifier N (324N)) is an alphanumeric expression uniquely associated with a path.

In one or more embodiments, a router entry (e.g., router entry A (322A), router entry N (322N)) is a data structure that includes data relevant to a router and a particular destination network. A router entry may include a router identifier (326), a location identifier (328), a destination network identifier (330), one or more path cost(s) (332A, 332N), and/or an optimal path identifier (334). Each of these components is described below.

In one or more embodiments, a router identifier (e.g., router identifier (326)) is an alphanumeric expression uniquely associated with a router.

In one or more embodiments, a location identifier (e.g., location identifier (328)) is an alphanumeric expression uniquely associated with a location. A location identifier (328) may be added to a router entry (322) to associate a router (via the router identifier (326)) with a specific location.

In one or more embodiments, a destination network identifier (e.g., destination network identifier (330)) is an alphanumeric expression uniquely associated with a destination network.

In one or more embodiments, a path cost (e.g., path cost A (332A), path cost N (332N)) is quantitative and/or qualitative measurements of a property of an associated path of the system. Non-limiting examples of path costs include, round trip time (RTT), path length, load, number of hops (e.g., "hop count"), link utilization (e.g., using simple network management protocol (SNMP)), packet loss, latency (e.g., delay), bandwidth, maximum transmission unit (MTU), speed, and/or throughput. When using one or more of the aforementioned path cost variables, the value of the variable may be normalized such that, when combined, a single combined "path cost" may be calculated. The process of normalization may include reversing (i.e., inverting) the scale such that an increase or decrease in value produces a consistent effect on the combined path cost. For example, if a hop count (lower is better) is combined with bandwidth (higher is better), the bandwidth scale may be reversed, such that a decrease in bandwidth value is considered superior to a higher value (although the opposite is normally true). Accordingly, once reversed, the bandwidth may be combined with the hop count to produce a single combined path cost where "lower is better" overall (and for each variable therein). As used herein, a "lower" cost (a positive number closer or equal to 0) is considered better and a "higher" cost (a positive number further from 0) is considered not as good. One of ordinary skill in the art, having the benefit of this detailed description, would appreciate the process of normalizing and combining variables to produce a single combined score, and that "higher" score may be calculated to be considered better than a lower score.

In one or more embodiments, an optimal path is a path with lowest associated path cost (332) within a router entry (322). As a lower path cost is considered superior to a higher path cost, the path associated with the lowest path cost is chosen as the "optimal path" (e.g., via the associated path identifier (324)). In one or more embodiments, the optimal path may have the lowest path cost by a single factor or any combination of factors (as discussed in the description of the path cost (332)).

In one or more embodiments, an optimal path is a path with lowest associated path cost (332) within a router entry (322). As a lower path cost is considered superior to a higher path cost, the path associated with the lowest path cost is chosen as the "optimal path" (e.g., via the associated path identifier (324)). In one or more embodiments, the optimal path may have the lowest path cost by a single factor or any combination of factors (as discussed in the description of the path cost (332)).

In one or more embodiments, an optimal path identifier (e.g., optimal path identifier (334)) is an alphanumeric expression uniquely associated with a path that has been identified as the most optimal (i.e., the "optimal path") for the given router entry (322) (i.e., has lowest path cost). In one or more embodiments, the optimal path identifier (334) may match the path identifier associated with the lowest comparative path cost (332).

In one or more embodiments, a router entry (322) may include a router location bitmask (not shown) that identifies the location of the router associated with the router entry (322). Router location bitmasks are discussed in further detail in the discussion of FIG. 4.

While FIG. 3 shows a specific configuration of a system, other configurations may be used without departing from the scope. Accordingly, embodiments disclosed herein should not be limited to the configuration of devices and/or components shown in FIG. 3.

Figure 4:
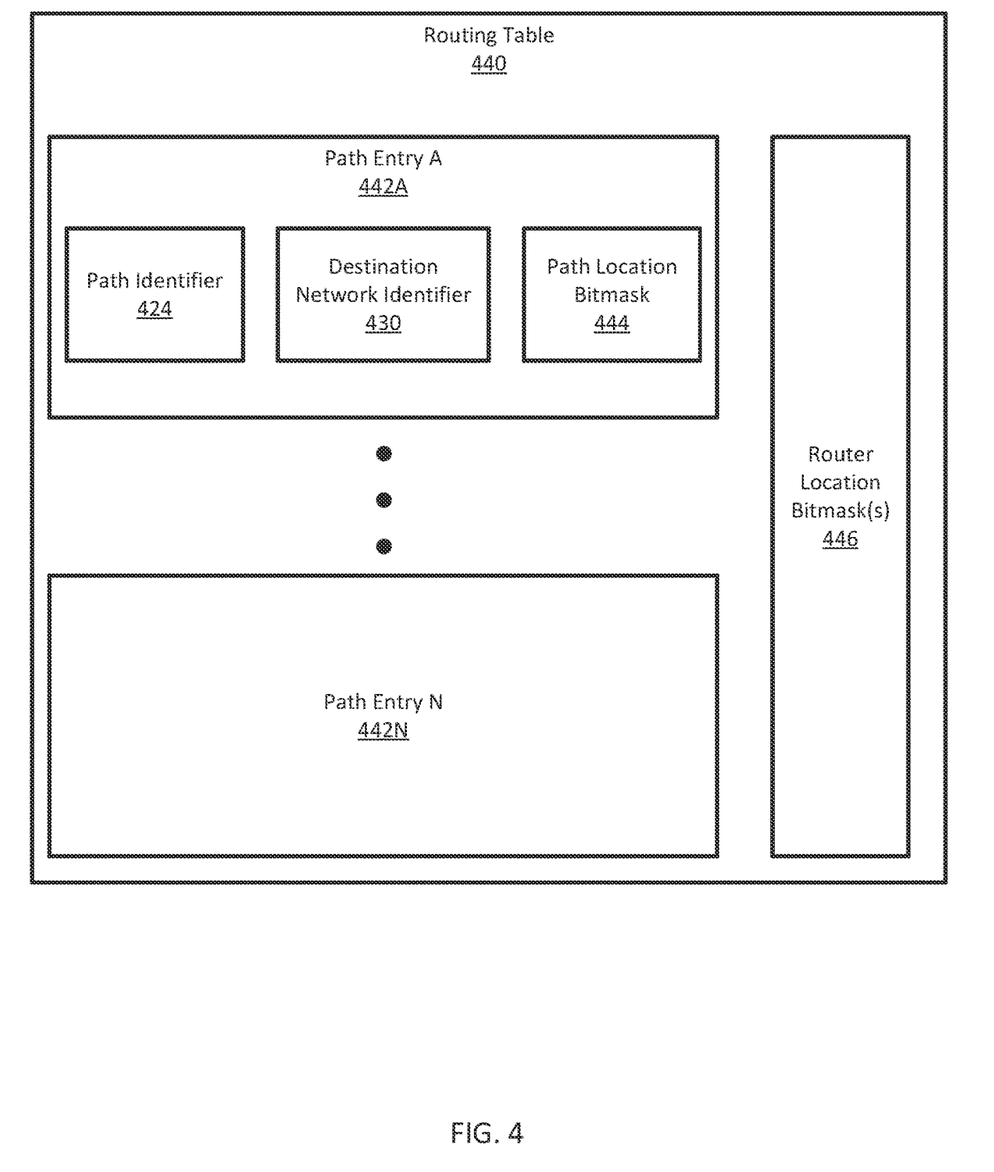
FIG. 4 shows a diagram of a routing table, in accordance with one or more embodiments.

FIG. 4 shows a diagram of a routing table, in accordance with one or more embodiments. In one or more embodiments, a routing table (e.g., routing table (440)) is a data structure, stored in the memory/storage of the route reflector (not shown). The routing table (440) may include one or more path entries (e.g., path entry A (442A), path entry N (442N)) and one or more router location bitmask(s) (446). Although the routing table (440) is referred to as a "table", any data structure may be used that is capable of storing information as described herein. Similarly named components, shown in this figure, have all of the same properties and functionalities as described in previous figures. Accordingly, only additional components, properties, and functionalities will be described below.

In one or more embodiments, a path entry (e.g., path entry A (442A), path entry N (442N)) is a data structure that includes data relevant to a path and a particular destination network. A path entry (442) may include a path identifier (424), a destination network identifier (430), and a path location bitmask (444).

A bitmask is a series of bits (each represented as a "0" or "1"), where each bit may be associated with a property. Each bit is located in a "bitmask position" of the bitmask. Further, a bit with a value of "1" indicates that the property is active/valid/applicable, whereas a bit with a value of "0" indicates the property is not active/valid/applicable. As a non-limiting example, a bitmask for representing the day of the week could have seven bits, where each bit is uniquely associated with a different day of the week. Therefore, a bitmask of "0010000" would represent "Tuesday" (assuming the week starts on Sunday), as Tuesday is the third day of the week, and the third bit is equal to "1". As another non-limiting example, a bitmask could be used to represent which light bulbs in a house are on or off. In a house with ten lights, the bitmask could be "1101011001" showing that six lights are on-specifically the six lights associated with the specific bits that are equal to "1".

A bitmask can be particularly useful as storage for the data consumes very little space. Further, simple Boolean operations can be performed on bitmasks to quickly determine various properties of the system. As an example, if the bitmask is "0010000" (representing "Tuesday"), and a determination needed to be made if the bitmask matches any of the days in a second bitmask ("1011000" for Sunday, Tuesday, and Wednesday), a "bitwise AND" operation may be performed using both bitmasks. The result bitmask would be "0010000" indicating that both bitmasks share the same third bit in an active state ("Tuesday").

In one or more embodiments, a path location bitmask (e.g., path location bitmask (444)) is a bitmask that indicates which location(s) a path is associated with. A path location bitmask (444) may indicate one or more location(s) for which a path was found to be an "optimal path" (to a particular destination network). Similarly, in one or more embodiments, a router location bitmask (e.g., router location bitmask(s) (446)) is a bitmask that indicates which location (s) a router is associated with (e.g., the location(s) in which the router resides).

As an example, a location bitmask, generally, could have two bits, where the first bit is set to "1" to indicate an association with "Location A" and the second bit is set to "1" to indicate an association with "Location B". Accordingly, as a non-limiting example, a router location bitmask (446) of "10" would indicate that the router is associated with "Location A" (but not "Location B"). As another non-limiting example, a path location bitmask (444) of "11" indicates that the path of the path entry (442) is associated with "Location A" and "Location B". One of ordinary skill in the art, having the benefit of this detailed description, would appreciate how a bitmask may be utilized.

While FIG. 4 shows a specific configuration of a system, other configurations may be used without departing from the scope. Accordingly, embodiments disclosed herein should not be limited to the configuration of devices and/or components shown in FIG. 4.

Figure 5:
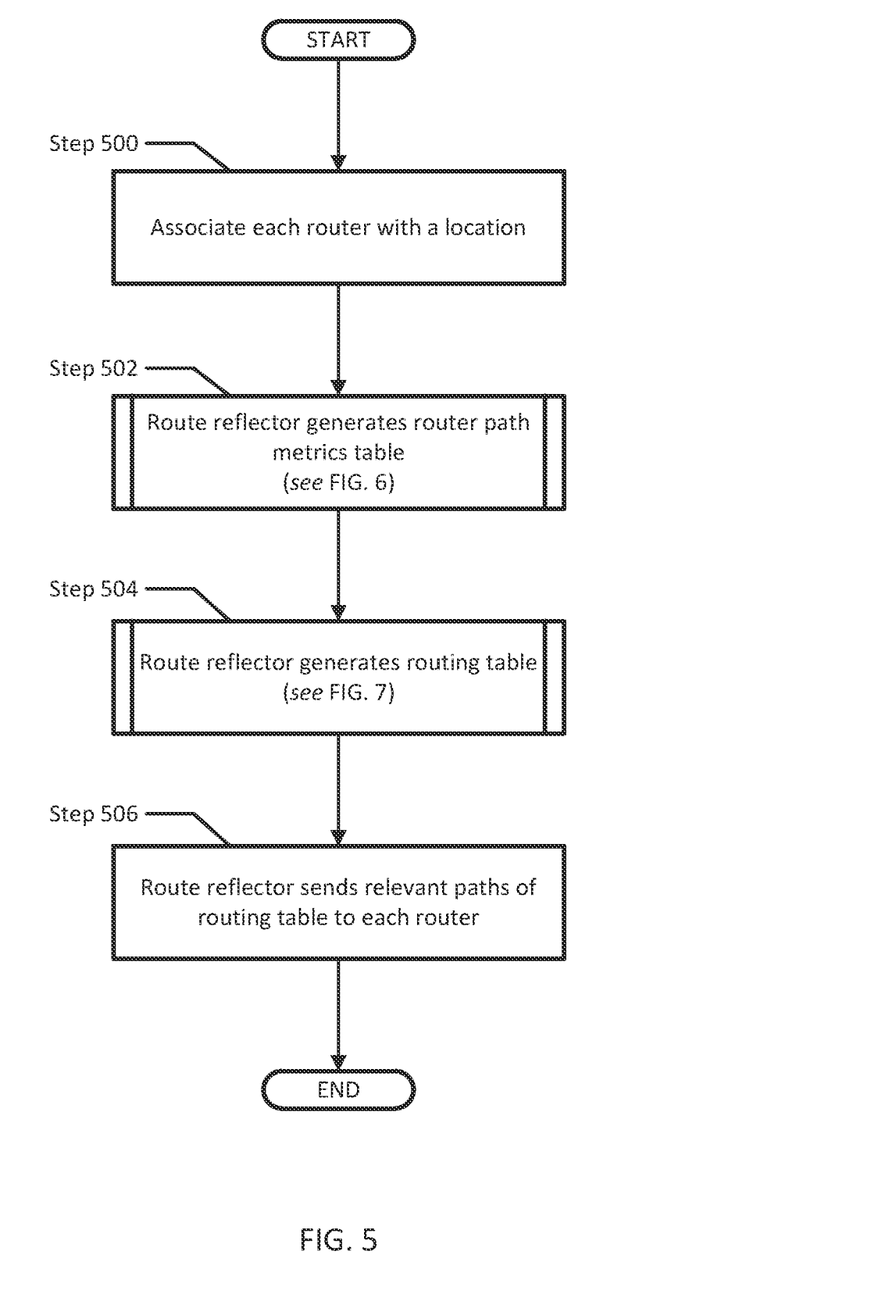
FIG. 5 shows a flowchart of a method of generating and advertising routing paths to routers in a superset source network, in accordance with one or more embodiments.

FIG. 5 shows a flowchart of a method of generating and advertising routing paths to routers in a superset source network, in accordance with one or more embodiments. All or a portion of the method shown in FIG. 5 may be performed by one or more components of the route reflector. However, another component of the system may perform this method without departing from the embodiment. While the various steps in this flowchart are presented and described sequentially, one of ordinary skill in the relevant art will appreciate that some or all of the steps may be executed in different orders, may be combined or omitted, and some or all steps may be executed in parallel.

In Step 500, each router is associated with a location. Associating a router with a location may be performed by a user of the system (e.g., a network administrator) that may manually define a location property for one or more routers in the system. Alternatively, in one or more embodiments, a location identifier may be automatically assigned by one or more devices of the system. In any instance, the "location" may be an alphanumeric express that may or may not correlate to a known geographic location. As a non-limiting example, a route reflector may associate two routers with "location1" because both routers share similar metrics (meaning they are likely co-located). Accordingly, although the routers' locations may not be physically identifiable, they are nonetheless assigned the same location ("location1"). Further, locations initially assigned by a user or system may be changed at a later point by a user or a system.

In Step 502, the route reflector generates a router path metrics table. Additional details regarding the generation of the router path metrics table may be found in the description of FIG. 6.

In Step 504, the route reflector generates a routing table. In one or more embodiments, the router path metrics table may be used to generate the routing table. Additional details regarding the generation of the routing table may be found in the description of FIG. 7.

In Step 506, the route reflector sends (e.g., pushes, advertises, distributes, makes available, etc.) the relevant routes to each of the applicable routers. In one or more embodiments, the relevant routes are determined based on the result bitmask obtained when comparing a path location bitmask with a router location bitmask. Additional details regarding which routes are determined to be relevant to which routers, may be found in the description of FIG. 7.

Figure 6:
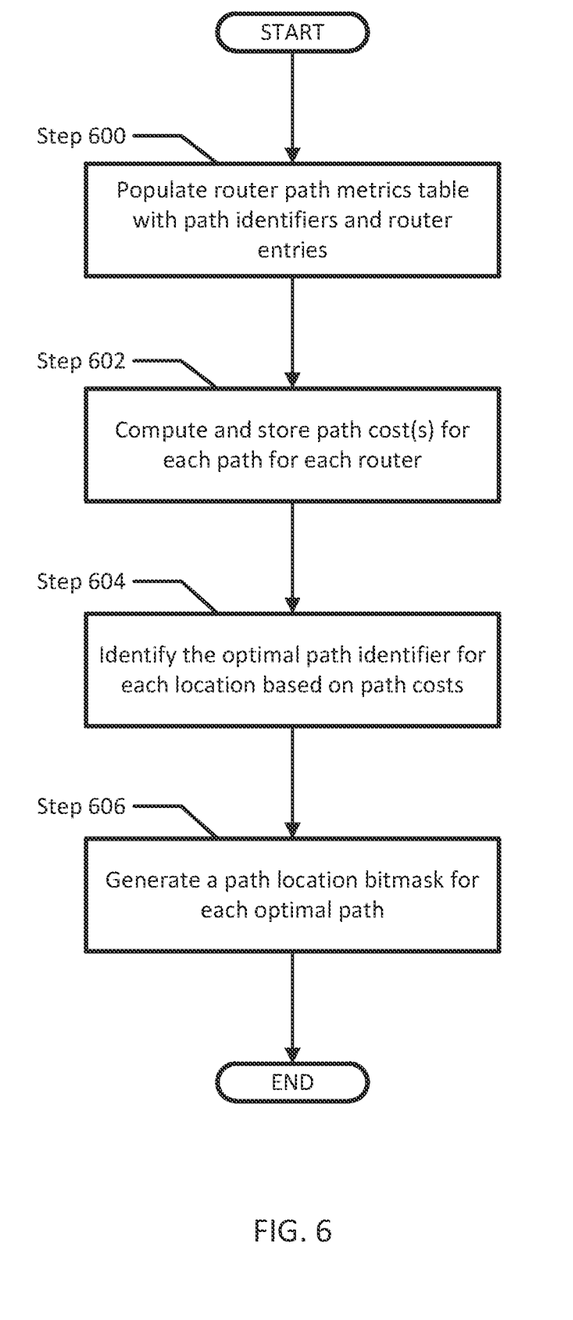
FIG. 6 shows a flowchart of a method of generating a router path metrics table, in accordance with one or more embodiments.

FIG. 6 shows a flowchart of a method of generating a router path metrics table, in accordance with one or more embodiments. All or a portion of the method shown in FIG. 6 may be performed by one or more components of the route reflector. However, another component of the system may perform this method without departing from the embodiment. While the various steps in this flowchart are presented and described sequentially, one of ordinary skill in the relevant art will appreciate that some or all of the steps may be executed in different orders, may be combined or omitted, and some or all steps may be executed in parallel.

In Step 600, the route reflector populates the router path metrics table with path identifiers and router entries for each router. Further, each router entry may be populated with (i) router identifiers, (ii) location identifiers, (iii) destination network identifiers, (iv) allocated space for path costs for each path identifier, and (v) allocated space for an optimal path identifier.

Prior to Step 600, the route reflector obtains and maintains a database of paths and routers in the system. For each router entry, other information may be obtained from the routers (i.e., the router identifier and location identifier). Further, if the router path metrics table does not already exist prior to Step 600, the route reflector creates the router path metrics table.

Further, a separate router entry may be generated for each destination network identifier—for the same router. As an example, a system with four routers and two destination networks, may have eight router entries.

In Step 602, path costs are computed, gathered, stored, and/or otherwise obtained in the router path metrics table. As discussed in the description of FIG. 3, non-limiting examples of path costs include, round trip time (RTT), path length, bandwidth, load, number of hops (e.g., "hop count"), maximum transmission unit (MTU), reliability, communications cost, link utilization (e.g., using simple network management protocol (SNMP)), speed of the path, packet loss, latency (e.g., delay), and/or throughput.

In one or more embodiments, a route reflector may gather path costs by collecting it from the routers. The route reflector may request the router to initiate one or more processes to measure a path cost and then have the router send the result back to the route reflector. In one or more embodiments, a route reflector may measure these metrics independently, by augmenting one or more available path costs of the route reflector.

In Step 604, the route reflector identifies the optimal path identifier for each router entry based on the path costs. Specifically, the path identifier associated with the lowest path cost is chosen as the optimal path identifier. In one or more embodiments, the route reflector identifies the optimal path identifier that is associated with each location identifier. In one or more embodiments, the route reflector identifies the optimal path identifier that is associated with each location identifier.

In Step 606, the route reflector generates a path location bitmask for each optimal path, where each path location bitmask associates each optimal path with one or more location identifiers. That is, in one or more embodiments, an optimal path may be associated with a location (via the path location bitmask) instead of specific routers. In each path location bitmask, each bit is associated with a different location for which that path was determined to be the "optimal path" (Step 604). If a path is found to be the "optimal path" for more than one location, multiple bits of the path location bitmask may be set to "1" (for each location the path is "optimal").

Figure 7:
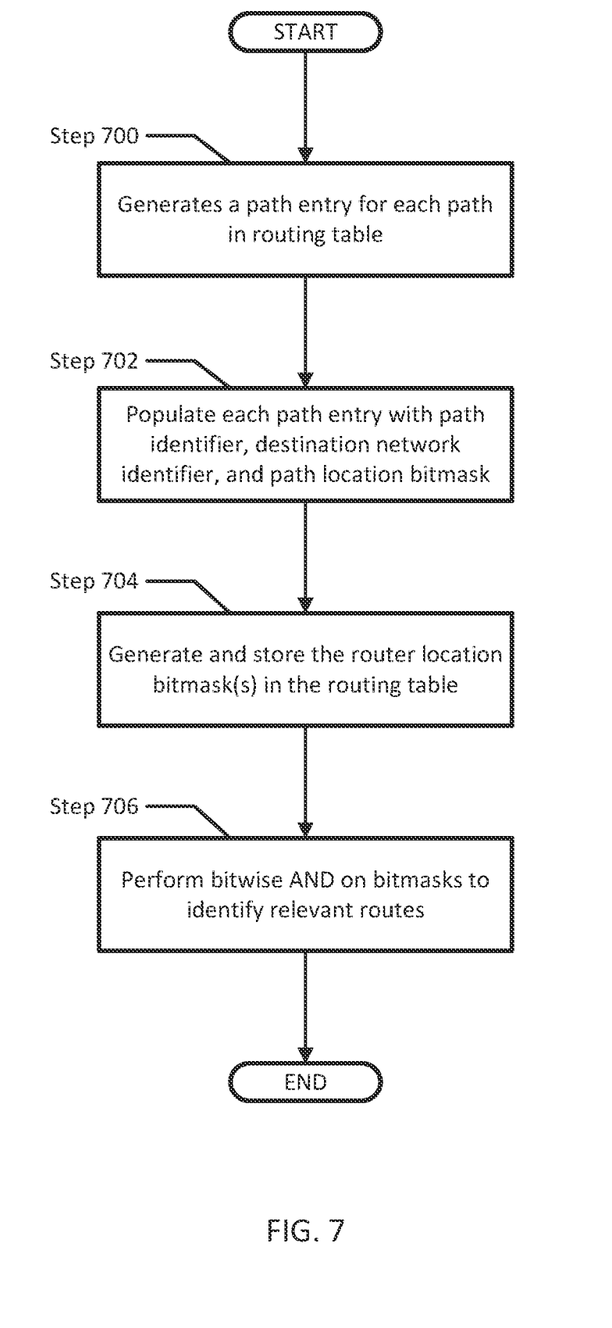
FIG. 7 shows a flowchart of a method of generating a routing table, in accordance with one or more embodiments.

FIG. 7 shows a flowchart of a method of generating a routing table, in accordance with one or more embodiments. All or a portion of the method shown in FIG. 7 may be performed by one or more components of the route reflector. However, another component of the system may perform this method without departing from the embodiment. While the various steps in this flowchart are presented and described sequentially, one of ordinary skill in the relevant art will appreciate that some or all of the steps may be executed in different orders, may be combined or omitted, and some or all steps may be executed in parallel.

In Step 700, the route reflector generates a path entry, in a routing table, for each path of the system. In one or more embodiments, paths that were not determined to be "optimal paths" (from Step 604) may be excluded from the routing table (i.e., paths not identified as an "optimal path" for any location and/or router entry). Further, if the routing table does not already exist prior to Step 700, the route reflector creates the routing table.

In Step 702, the route reflector populates each path entry with a path identifier, a destination network identifier, and the path location bitmask (generated in Step 606) associated with that path.

In Step 704, the route reflector generates and stores (and/or otherwise obtains) the router location bitmask(s) in the routing table. In one or more embodiments, the router location bitmask(s) are not part of any path entry, but instead are applicable to all path entries. The router location bitmask(s) include a location bitmask for each router, which indicates the associated locations for each router in the system. In one or more embodiments, the router location bitmask(s) may be generated using the router path metrics table (e.g., using the router identifier and location identifier of each router entry).

In Step 706, the route reflector performs a "bitwise AND" operation (and/or any other applicable mathematical and/or logical operation) to compare the path location bitmask for each path entry (separately) against each router location bitmask individually.

The result of any comparison is another bitmask (i.e., a "result bitmask"). If a single "1" (nonzero) bit is present in the result bitmask (for any one of the bitwise AND comparisons), the path indicated in that path entry is tagged to be sent (e.g., advertised) to the router with the matching router location bitmask. In such an instance, the path and the router may be considered to have a "location association".

Figure 8:
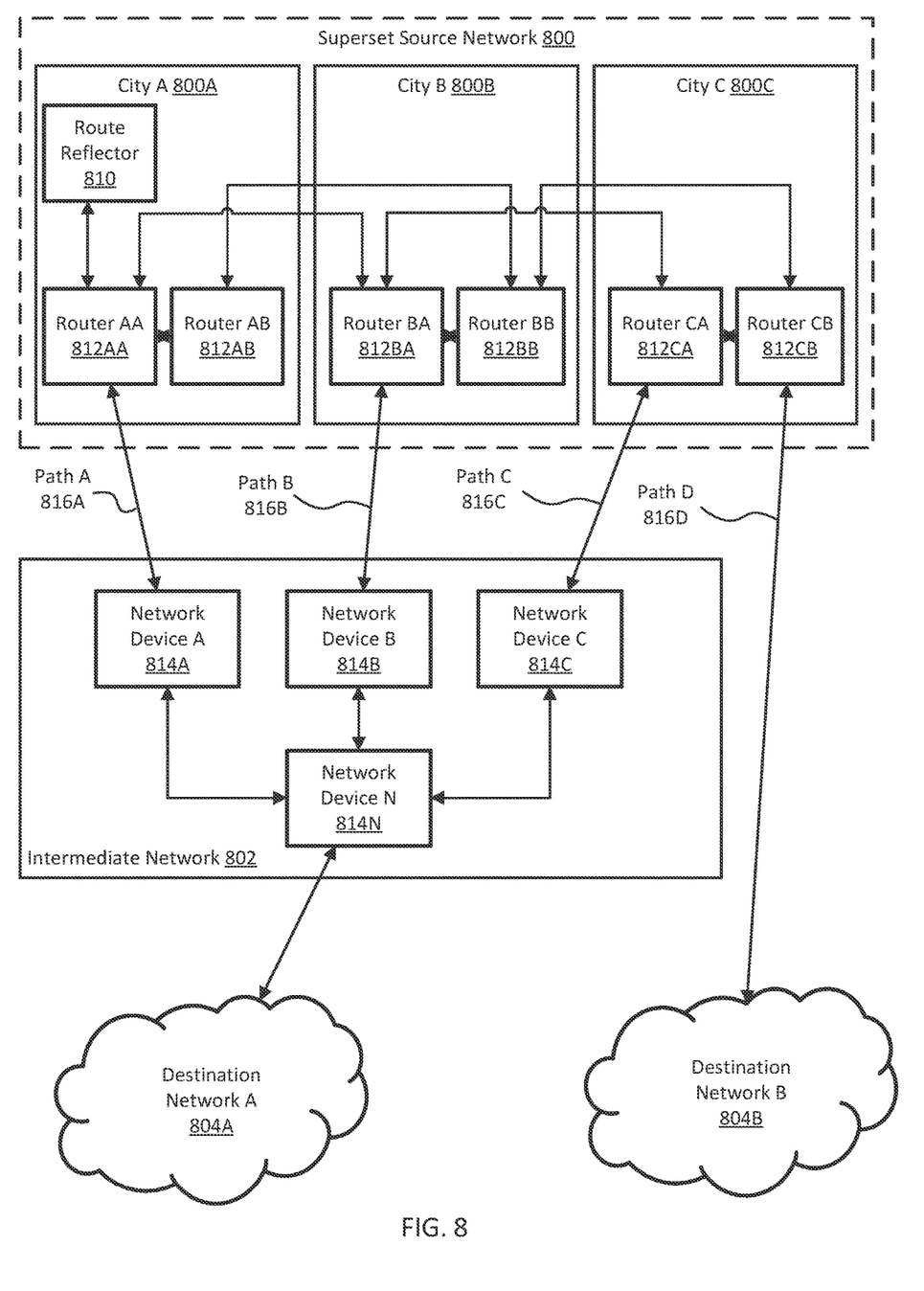
FIG. 8 shows an example, in accordance with one or more embodiments.

FIG. 8 shows an example, in accordance with one or more embodiments. The following use case is for explanatory purposes only and not intended to limit the scope to this embodiment. In FIG. 8, consider a scenario in which a superset source network (800) includes three networks (City A (800A), City B (800B), and City C (800C)). Further, each of those three networks includes two routers. City A (800A) includes router AA (812AA) and router AB (812AB). City B (800B) includes router BA (812BA) and router BB (812BB). City C (800C) includes router CA (812CA) and router CB (812CB). Additionally, City A (800A) includes a route reflector (810) that is operatively connected to, at least, router AA (812AA).

As shown in FIG. 8, router AA (812AA) is operatively connected to router AB (812AB) (of City A (800A) and router BA (812BA) (of city B (800B)). Router AB (812AB) is operatively connected to router BB (812BB) (of city B (800B)). Router BA (812BA) is operatively connected to router CA (812CB)(of city C (800C)). Lastly, router BB (812BB) is operatively connected to router CB (812CB) (of city C (800C)). In the example of FIG. 8, the connection between routers is a layer-3 network connection.

Further, as shown in FIG. 8, router AA (812AA) is operatively connected to network device A (814A) of intermediate network (802) via path A (816A). Router BA is operatively connected to network device B (814B) of intermediate network (802) via path B (816B). Router CA (812CA) is operatively connected to network device C (814C) of intermediate network (802) via path C (816C). Lastly, router CB (812CB) is operatively connected to a network device (not shown) in destination network B (804B) via path D (816D). Each of the connections from a router (812) to a network device (814) of the intermediate network (802) includes, at least, an eBGP session.

Figure 9:
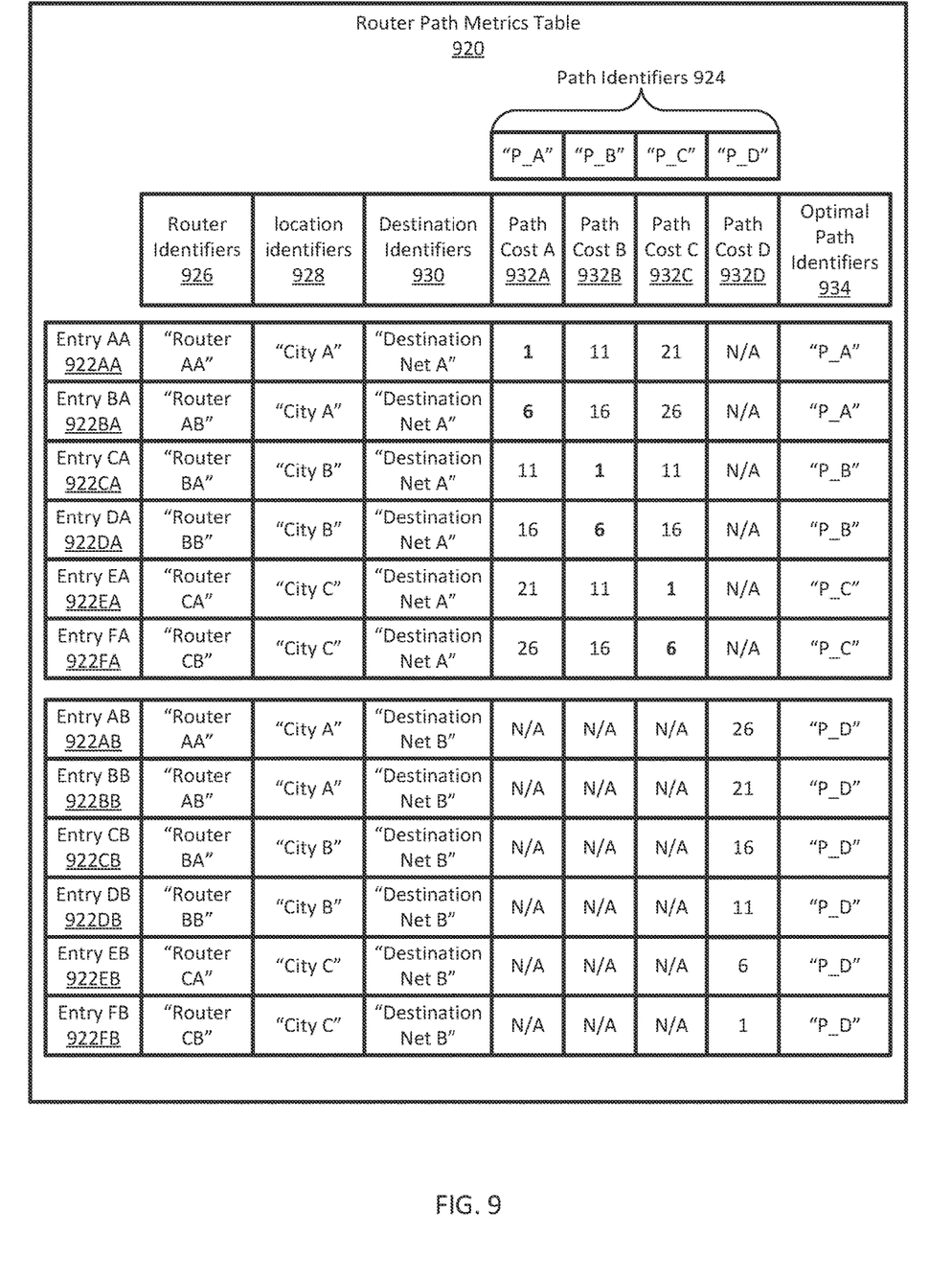
FIG. 9 shows an example of a router path metrics table, in accordance with one or more embodiments.

FIG. 9 shows an example of a router path metrics table, in accordance with one or more embodiments. FIG. 9 continues with the example system as shown in FIG. 8. Accordingly, devices referenced in the description of FIG. 9 should be considered to have all of the same properties as described in the description of FIG. 8. The following use case is for explanatory purposes only and not intended to limit the scope to this embodiment.

Consider a scenario where using the operative connection between (i), any router and external network device (i.e., a path) adds one ("1") to the path cost (932); (ii) any two routers in the same source network adds five ("5") to the path cost (932), and lastly, (iii) any router (e.g., 812AA) in one city (e.g., 800A) and a router (e.g., 812AB) in another city (800B) adds ten ("10") to the path cost (932).

Accordingly, for entry AA (922AA), the router identifier (926) indicates the "Router AA" is being analyzed for paths to "Destination Net A" as indicated by destination identifier (930). Further, it can be seen that the path cost A (932A) is "1" as "Router AA" can directly utilize Path A ("P_A" as indicated as the path identifier (924)).

However, for "Router AA" to access "Destination Net A" via path B ("P_B" as indicated as the path identifier (924)), there is a path cost B (932B) of "11". Path cost B (932B) is "11" because, in order for "Router AA" to utilize path B, traffic must first be routed from "Router AA" to "Router BA" (costing 10), then be routed over path B (costing another 1).

Further, for "Router AA" to access "Destination Net A" via path C ("P_C" as indicated as the path identifier (924)), there is a path cost C (932C) of "21". Path cost C (932C) is "21" because, in order for "Router AA" to utilize path C, traffic must first be routed from "Router AA" to "Router BA" (costing 10), then be routed from "Router BA" to "Router CA" (costing another 10), before finally being routed over path C (costing 1).

Lastly, path cost D (932D) is "N/A" as path D ("P_D" as indicated as the path identifier (924)) does not connect to "Destination Net A" (as indicated by the destination identifier (930) of entry AA (922AA)). Accordingly, the optimal path identifier (934) for entry AA (922AA) is "P_A" (path A) as "P_A" has the lowest associated path cost (932).

Similar metrics are measured, recorded and stored for the remaining entries (entry BA (922BA), entry CA (922CA), entry DA (922DA), entry EA (922EA), entry FA (922BA), entry AB (922AB), entry BB (922BB), entry CB (922CB), entry DB (922DB), entry EB (922EB), entry FB (922FB)).

Further, as provided in FIG. 8, and tabulated in FIG. 9, there is only a single path to "Destination Net B" from each router. Accordingly, for the lower six entries (922A-FB), the optimal path identifier (934) is "P_D" as there is no other path cost (932A-C) to compare against path cost D (932D) in each entry. Therefore, regardless of the value for path cost D (932D), path identifier (924) "P_D" is chosen as the optimal path identifier (934).

Lastly, the route reflector uses the router path metrics table (920) to match optimal path identifiers (934) with location identifiers (928). Using the example of FIG. 9, each path indicator (924) appears at least once as a unique optimal path indicator (934). Accordingly, there will be at least one location identifier (928) for each optimal path identifier (934). Going down the list, path A ("P_A") is matched only with "City A" (twice), path B ("P_B") is matched only with "City B" (twice), path C ("P_C") is matched only with "City C" (twice), and path D ("P_D") is matched with each city (twice).

Figure 10:
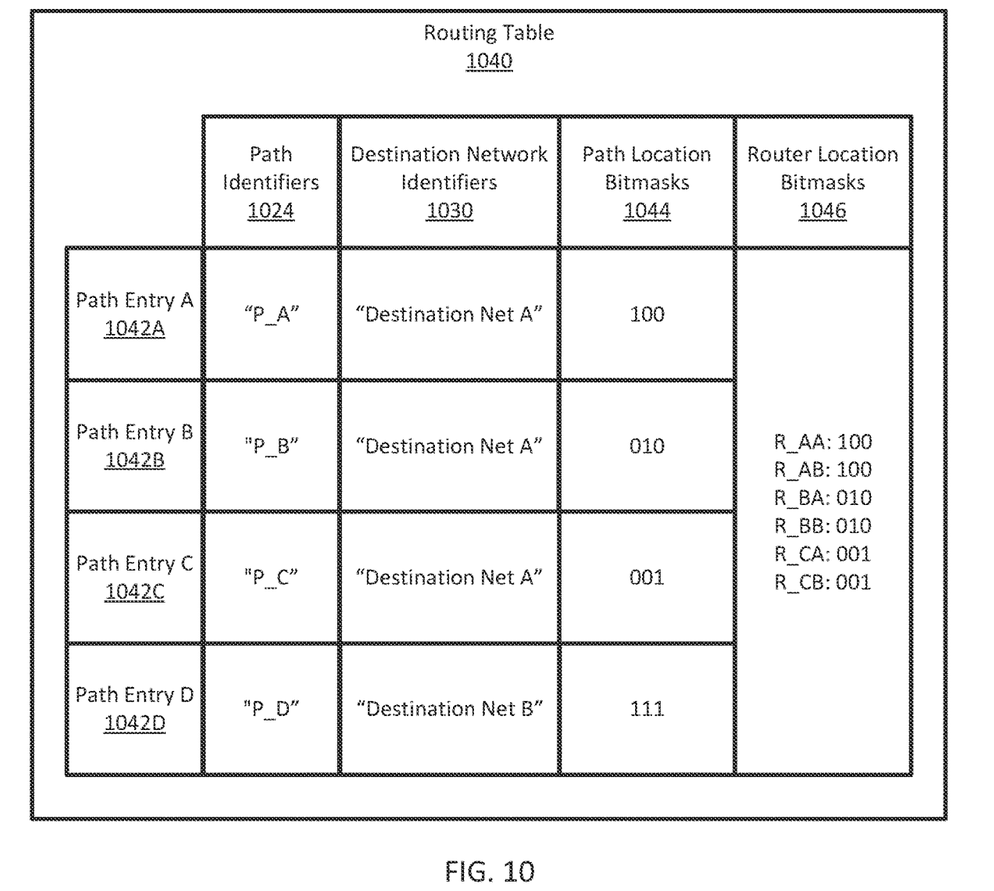
FIG. 10 shows an example of a routing table, in accordance with one or more embodiments.

Accordingly, as can be seen in FIG. 10, if there is a bitmask that is at least three bits long (the bitmask may be longer with unused trailing zeros), each path may be associated with a path location bitmask.

FIG. 10 shows an example of a routing table, in accordance with one or more embodiments. FIG. 10 continues with the example system as shown in FIGS. 8 and 9. Accordingly, devices referenced in the description of FIG. 10 should be considered to have all of the same properties as described in the description of FIGS. 8 and 9. The following use case is for explanatory purposes only and not intended to limit the scope to this embodiment.

Consider a scenario where the example router path metrics table of FIG. 9 has been fully generated by the route reflector of FIG. 8, and the route reflector begins to generate a routing table (1040) (as shown in FIG. 10). Initially a path entry (1042) is generated for each path of the system (as shown in FIG. 8). In one or more embodiments, paths that do not have any matching router location identifier (from FIG. 9) may be excluded from the routing table.

Each path is matched to its respective destination network identifier (1030). Paths A, B, and C (of path entries A-C (1042A-C)) are each matched to destination network identifier (1030) "Destination Net A" as paths A, B, and C are used as an operative connection between superset source network and destination network A. Lastly, path D (of path entry D (1042D)) is matched to "Destination Net B" as path D is used as the operative connection between superset source network and destination network B.

Further, as discussed at the end of FIG. 9, each path is matched to its respective locations via an associated path location bitmask (1044). In the example of FIGS. 8-10, the path location bitmask (1044) has three bits, where the first bit is set to "1" if the path is associated with "City A" (e.g., 100). The second bit is set to "1" if the path is associated with "City B" (e.g., 010). Finally, the third bit is set to "1" if the path is associated with "City C" (e.g., 001). Further, a path may be associated with 0, 1, 2, or all 3 cities. For example, a path associated with "City A" and "City C" would have a path location bitmask (1044) of "101".

Accordingly, path A (of path entry A (1042A) with path identifier (1024) "P_A") is matched to "City A" and is therefore given a path location bitmask (1044) of "100". Path B (of path entry B (1042B) with path identifier (1024) "P_B") is matched to "City B" and is therefore given a path location bitmask (1044) of "010". Path C (of path entry C (1042C) with path identifier (1024) "P_C") is matched to "City C" and is therefore given a path location bitmask (1044) of "001". Lastly, path D (of path entry D (1042D) with path identifier (1024) "P_D") matched with all three cities and is therefore given a path location bitmask (1044) of "111".

Further, router location bitmasks (1046) are present in the routing table (1040) but are not a part of (or are assigned to) any particular path entry (1042). For compactness, within the router location bitmasks (1046), each router is abbreviated to "R_**". Here, it can be seen that a location bitmask (similar to the path location bitmask (1044)) is present for each of the six routers in the system of FIG. 8. The router location bitmasks (1046) of FIG. 10 match the location identifiers of FIG. 9 using the same bitmask system described above for the path location bitmask (1044), with each bit representing a separate city. Accordingly, as an example, router BB (identified as "R_BB") has an associated router location bitmask (1046) of "010", indicating that router BB is in city B.

As a next step, to send the relevant routes to each of the routers, the route reflector performs a "bitwise AND" function of the path location bitmask (1044) and router location bitmasks (1046) for each path entry (1042). If a single "1" bit is present after the operation, the path indicated in that path entry (1042) is advertised (i.e., sent) to the router(s) with the matching router location bitmask (1046).

As an example, for path entry A (1042A), the path location bitmask (1044) of "100" is compared using the bitwise "AND" function against each router location bitmask (1046). When compared, "R_AA" and "R_AB" will have a result bitmask of "100", where the remaining four routers would have result bitmasks of all zeros ("000") indicating no matches were made. Accordingly, path A is then advertised to both router AA and router AB (both routers of city A) as the path to use for communicating with "Destination Net A" (the associated destination network identifier (1030)). Further, this makes logical sense, as path A is directly connected to city A (and router AA, specifically) and further has the lowest path costs (1 and 6) for those routers.

Skipping to path entry D (1042D), the bitwise "AND" operation of the path location bitmask (1044) of "111" will match each router for their respective location. For example, when a bitwise AND operation is performed on (1) router BA with router location bitmask "010" (1046), and (2) path location bitmask "111" (1044), the result will be "010". Accordingly, path D (of path entry D (1042D)) is advertised to all six routers as the operative connection to use when communicating with "Destination Net B". Again, this makes logical sense as path D is the only route available to communicate with destination network B for all routers.

As articulated above, specific embodiments are described with reference to the accompanying figures. In the preceding description, numerous details were set forth as examples. One of ordinary skill in the art, having the benefit of this detailed description, would appreciate that one or more embodiments described above may be practiced without the explicitly articulated details, and that numerous variations or modifications may be possible without departing from the scope. Certain details known to those of ordinary skill in the art may be omitted to avoid obscuring the description.

In the preceding description of the figures, any component described with regard to a figure, in various embodiments, may be equivalent to one or more like-named components shown and/or described with regard to any other figure. For brevity, descriptions of these components were not repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

As used herein, the adjectives "source", "destination", and "intermediate" are for explanatory purposes only. That is, the components, devices, and collections of devices described using these adjectives are meant only to provide a better understanding to the reader in the context of a particular scenario—not to generally limit the capabilities of those components, devices, and collections of devices. As an example, a "component" may perform certain operations when acting as a "source component" and may perform some of the same and other operations when acting as a "destination component". However, each "component" (whether it be "source" or "destination") may be fully capable of performing the operations of either role.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for distributing an optimal path to a router using a route reflector, comprising:
   obtaining, by the route reflector, a path location bitmask associated with the optimal path, wherein the path location bitmask has a value that indicates one or more locations for which the optimal path was determined to be optimal;
   obtaining a router location bitmask having a value that indicates one or more locations associated with the router;
   performing a bitwise AND operation on the path location bitmask and the router location bitmask to obtain a result bitmask;
   identifying a nonzero bit in the result bitmask; and
   in response to identifying the nonzero bit:
      sending the optimal path to the router.

2. The method of claim 1, wherein the path location bitmask associates the optimal path with at least one location.

3. The method of claim 2, wherein after sending the optimal path to the router, the method further comprises:
   sending the optimal path to a second router, wherein the second router is associated with the at least one location.

4. The method of claim 3, wherein the optimal path is not directly operatively connected to the second router.

5. The method of claim 2, wherein the path location bitmask associates the optimal path with a second location, wherein the at least one location is different than the second location.

6. The method of claim 5, wherein after sending the optimal path to the router, the method further comprises:
   sending the optimal path to a second router, wherein the second router is associated with the second location.

7. The method of claim 1, wherein the router location bitmask associates the router with only one location.

8. The method of claim 2,
   wherein the path location bitmask further associates the optimal path with a second location,
   wherein the at least one location is different than the second location,
   wherein a second router location bitmask associates a second router with the second location, and
   wherein after sending the optimal path to the router, the method further comprises:
   sending the optimal path to the second router.

9. The method of claim 1, wherein obtaining the path location bitmask comprises:
   populating a router path metrics table with:
   a router entry associated with the router,
   a first path identifier associated with a first path, and
   a second path identifier associated with a second path;
   obtaining a first path cost associated with the first path identifier for the router entry;
   obtaining a second path cost associated with the second path identifier for the router entry;
   determining, based on the first path cost and the second path cost, which one of the first path and the second path is the optimal path; and
   generating the path location bitmask based on the optimal path and a location associated with the router entry.

10. The method of claim 1, wherein obtaining the router location bitmask comprises:
    looking up, in a router path metrics table, a router identifier and a location identifier; and
    generating the router location bitmask based on the router identifier and the location identifier.

11. A method for distributing a plurality of optimal paths to a plurality of routers using a route reflector, comprising:
    obtaining, by the route reflector, a plurality of path location bitmasks associated with the plurality of optimal paths, respectively, wherein each path location bitmask has a value that indicates one or more locations for which a corresponding one or more of the plurality of optimal paths was determined to be optimal;
    obtaining a plurality of router location bitmasks associated with the plurality of routers, respectively, wherein each router location bitmask has a value that indicates one or more locations associated with a corresponding one of more the plurality of routers;
    for each path location bitmask of the plurality of path location bitmasks:
       performing a bitwise AND operation with each router location bitmask, of the plurality of router location bitmasks, to obtain a plurality of result bitmasks; and
       sending, to each router of the plurality of routers, an optimal path of the plurality of optimal paths, based on the plurality of result bitmasks.

12. The method of claim 11, wherein a first optimal path, of the plurality of optimal paths, is associated with a first location.

13. The method of claim 12, wherein a first router, of the plurality of routers, is associated with the first location, wherein the first optimal path is sent to the first router.

14. The method of claim 13, wherein the first optimal path is further associated with a second location, and wherein a second router, of the plurality of routers, is associated with the second location, and wherein the first optimal path is sent to the second router.

15. The method of claim 14,
    wherein the plurality of result bitmasks comprises a first result bitmask,
    wherein the first result bitmask is associated with the first router,
    wherein the first result bitmask comprises a first plurality of bitmask positions, and
    wherein the first plurality of bitmask positions comprises a first nonzero bit in a first bitmask position.

16. The method of claim 15,
    wherein the plurality of result bitmasks comprises a second result bitmask,
    wherein the second result bitmask is associated with the second router,
    wherein the second result bitmask comprises a second plurality of bitmask positions, and
    wherein the second plurality of bitmask positions comprises a second nonzero bit in a second bitmask position.

17. A route reflector, comprising:
    memory; and
    a processor, wherein the processor is configured to perform a method for distributing an optimal path to a router, comprising:
       generating a router path metrics table in the memory;
       obtaining a path location bitmask associated with the optimal path based on the router path metrics table, wherein the path location bitmask has a value that indicates one or more locations for which the optimal path was determined to be optimal and the optimal path is a path with a lowest associated path cost of a plurality of paths;

obtaining a router location bitmask having a value that indicates one or more locations associated with the router;

performing a bitwise AND operation on the path location bitmask and the router location bitmask to obtain a result bitmask;

identifying a nonzero bit in the result bitmask; and in response to identifying the nonzero bit:

sending the optimal path to the router.

18. The route reflector of claim 17, wherein generating the router path metrics table in the memory comprises:

populating the router path metrics table with:
  a router entry associated with the router,
  a first path identifier associated with a first path, and
  a second path identifier associated with a second path;

obtaining a first path cost associated with the first path identifier for the router entry;

obtaining a second path cost associated with the second path identifier for the router entry;

determining, based on the first path cost and the second path cost, which one of the first path and the second path is the optimal path; and generating the path location bitmask based on the optimal path and a location associated with the router entry.

19. The route reflector of claim 17, wherein the path location bitmask associates the optimal path with a location.

20. The route reflector of claim 19, wherein after sending the optimal path to the router, the method further comprises:

sending the optimal path to a second router, wherein the second router is associated with the location.

* * * * *